(12) United States Patent
Wunsch

(10) Patent No.: US 6,606,381 B1
(45) Date of Patent: Aug. 12, 2003

(54) DYNAMIC ORDERING OF AN ELECTRONIC PHONEBOOK

(75) Inventor: Charles Wunsch, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 09/372,533

(22) Filed: Aug. 11, 1999

Related U.S. Application Data

(63) Continuation-in-part of application No. 09/344,044, filed on Jun. 24, 1999, now abandoned.

(51) Int. Cl.[7] .............................................. H04M 1/00
(52) U.S. Cl. ............................. 379/356.01; 379/142.06
(58) Field of Search ...................... 379/356.01, 355.01, 379/142.06

(56) References Cited

U.S. PATENT DOCUMENTS

| | | | | |
|---|---|---|---|---|
| 5,267,308 A | * | 11/1993 | Jokinen ...................... 379/354 |
| 5,675,630 A | * | 10/1997 | Beatty .......................... 379/59 |
| 5,901,217 A | * | 5/1999 | Kanbar ........................ 379/355 |
| 6,127,945 A | * | 10/2000 | Mura-Smith ................ 340/988 |
| 6,173,045 B1 | * | 1/2001 | Smith ....................... 379/93.23 |
| 6,243,459 B1 | * | 6/2001 | Cannon ....................... 379/356 |
| 6,320,943 B1 | * | 11/2001 | Borland ................. 379/112.01 |

* cited by examiner

Primary Examiner—Ahmad F. Matar
Assistant Examiner—Rasha S AL-Aubaidi
(74) Attorney, Agent, or Firm—Harley R. Ball; Steven J. Funk; Kevin D. Robb

(57) ABSTRACT

A method and apparatus that orders or re-orders the entries in an electronic phonebook based on the number of calls made to and/or received from the phone numbers in the phonebook. The dynamic ordering permits the most frequently called and/or received phone numbers to be more accessible than less frequently called and/or received phone numbers, thus significantly reducing phonebook search times.

21 Claims, 5 Drawing Sheets

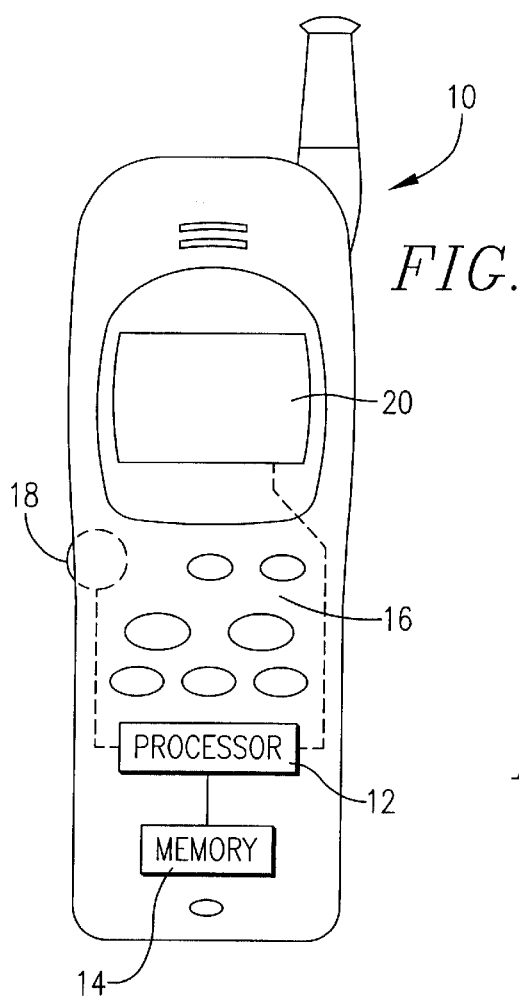
FIG.1.
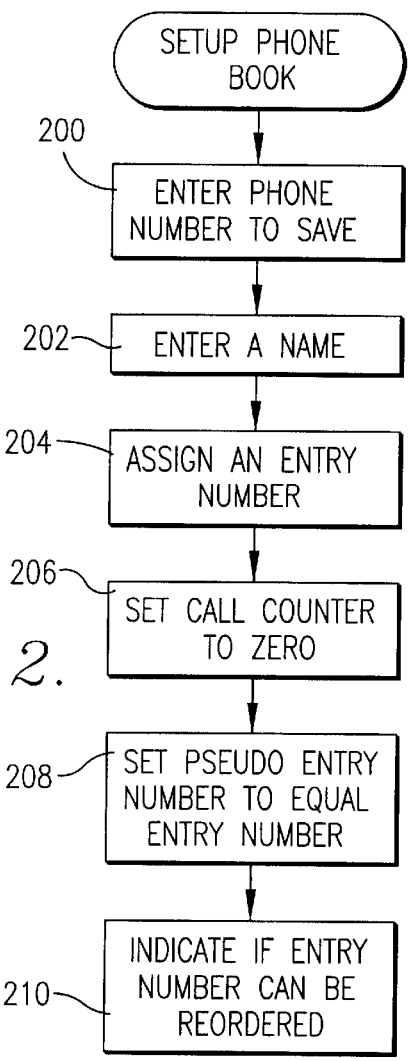
FIG.2.
FIG.3.
| ENTRY NUMBER | NAME | PHONE NUMBER | CALL COUNTER | PSEUDO ENTRY NUMBER | REORDER ENTRY ? |
|---|---|---|---|---|---|
| 1 | JOHN DOE | 913 111 1111 | 0 | 1 | Y |
| 2 | JANE DOE | 913 222 2222 | 0 | 2 | Y |
| ⋮ | ⋮ | ⋮ | ⋮ | ⋮ | ⋮ |
| 17 | JAY DOE | 816 555 5555 | 0 | 17 | N |
| ⋮ | ⋮ | ⋮ | ⋮ | ⋮ | ⋮ |
| M | JACK DOE | 913 MMM MMMM | 0 | M | Y |

DYNAMIC ORDERING OF AN ELECTRONIC PHONEBOOK

RELATED DISCLOSURES

This application is a continuation-in-part of Application Ser. No. 09/344,044, entitled DYNAMIC ORDERING OF AN ELECTRONIC PHONEBOOK, filed Jun. 24, 1999.

BACKGROUND OF THE INVENTION

1. Field of the Invention

The present invention relates to telecommunications. More particularly, the invention relates to a method and apparatus for dynamically ordering the entries in a phonebook of a communications device based on the number of calls made to and/or received from the phone numbers in the phone book.

2. Description of the Prior Art

Many communications devices such as digital wireless phones include electronic phonebooks or directories that allow the entry of a list of frequently called phone numbers. The phone numbers are typically arranged in the directory either in the order they were entered or alphabetically based on the name associated with each number.

Unfortunately, these methods of ordering electronic phonebooks make it difficult to look up and dial a number that is not near the top of the list. Specifically, if a user desires to dial a phone number that is near the bottom of the list, the user must either scroll down the entire list to locate the desired number or enter the entry number or name associated with the phone number. Phone users will appreciate that these steps are time-consuming and inconvenient, especially for mobile phones, which are often used while driving or performing other tasks. These problems are especially noticeable when calling frequently called numbers, which may be near the bottom of the directory because they were entered in the list last or because the names associated with the numbers are near the end of the alphabet.

SUMMARY OF THE INVENTION

The present invention solves the above-described problems and provides a distinct advance in the art of telecommunications. More particularly, the present invention provides a method and apparatus that orders or reorders the entries in an electronic phonebook based on the number of calls made to or received from the phone numbers in the phonebook. This dynamic ordering permits the most frequently called and/or received phone numbers to be more accessible than less frequently called and/or received phone numbers, thus significantly reducing phonebook search times.

The method and apparatus of the present invention also permits a user to restart a dynamic ordering procedure if the user changes his or her calling patterns because of a move, job change or other event. The method and apparatus also permits a user to select whether to order phonebook entries in a conventional manner or based on the dynamic ordering concepts of the present invention so that the user can selectively revert back to conventional phonebook ordering when desired.

BRIEF DESCRIPTION OF THE DRAWING FIGURES

A preferred embodiment of the present invention is described in detail below with reference to the attached drawing figures, wherein:

FIG. 1 is a schematic diagram generally illustrating a preferred communication device that may be used to implement the steps of one preferred embodiment of the present invention.

FIG. 2 is a flow diagram illustrating the steps to set up a phonebook configured in accordance with one aspect of the present invention.

FIG. 3 is a table illustrating an electronic phonebook listing containing a plurality of phone entries before the entries have been dynamically re-ordered.

DETAILED DESCRIPTION OF THE PREFERRED EMBODIMENTS

Figures 4, 6, 7:
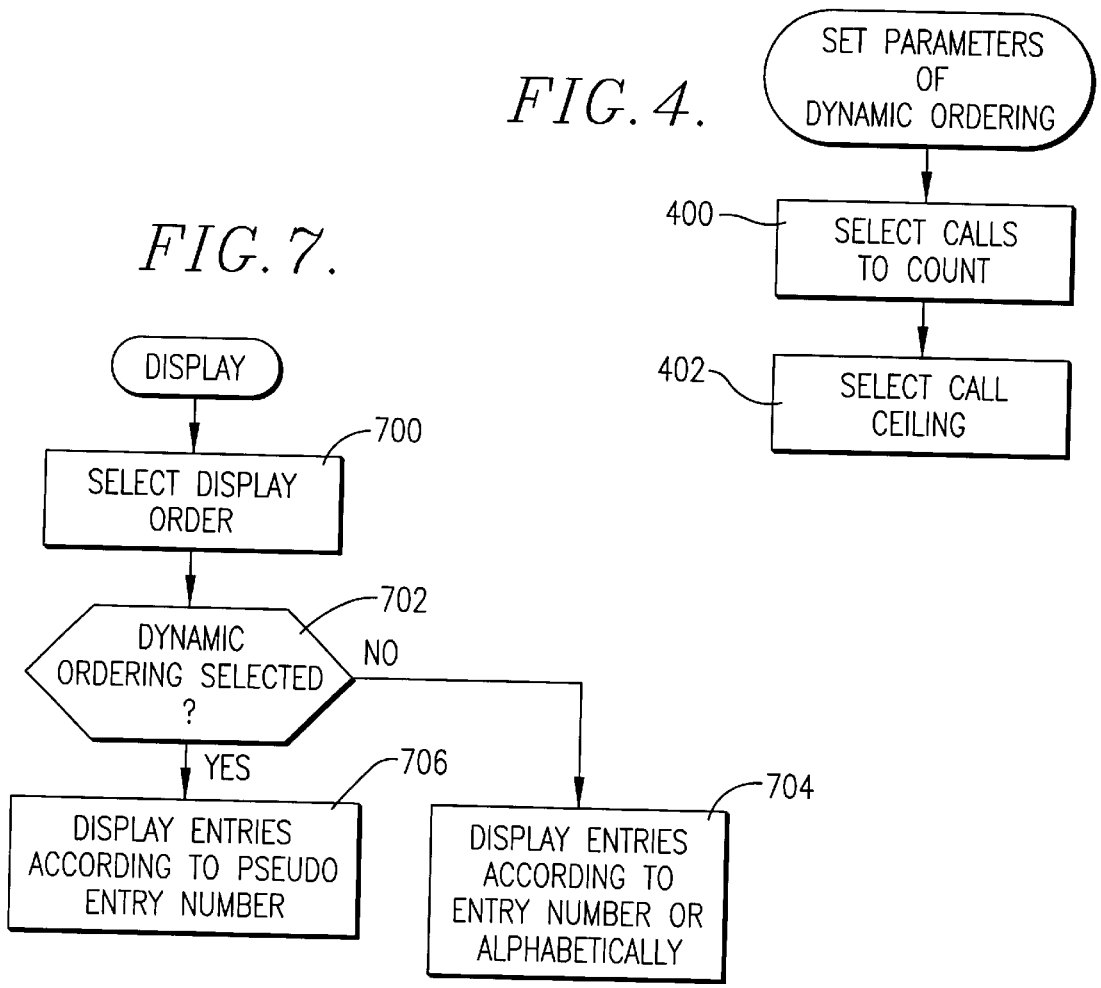
FIG. 4 is a flow diagram illustrating the steps to set certain parameters used in the method of the present invention.
FIG. 6 is a table illustrating the electronic phonebook of FIG. 3 after the entries have been dynamically re-ordered.
FIG. 7 is a flow diagram illustrating the steps to select the manner in which the entries in the phone book are displayed.

As illustrated in FIG. 1, the method of the present invention is preferably implemented in a wireless, digital phone 10 such as the ones manufactured by Qualcomm or Motorola for use in the digital, PCS, CDMA wireless network owned and operated by Sprint Spectrum L.P., a multipoint, multichannel distribution service known as Sprint PCS. However, those skilled in the art will appreciate that the method may be implemented in any communication device that is operable to send and receive communications over a wireless, landline or satellite communication network such as a wireless phone, a landline phone, a computer modem, a fax machine, a teleconferencing unit, etc.

Referring again to FIG. 1, the preferred wireless phone 10 includes, among other conventional elements, a processor 12 that is programmed to perform the dynamic ordering functions described herein and memory 14 coupled with the processor for storing phonebook entries and other data described herein. The processor is coupled with conventional input devices on the phone such as an alphanumeric keypad 16 and a scrolling dial 18 and is also coupled with the phone's display 20.

FIG. 2 generally illustrates the steps to initially set up a phonebook or directory in the communication device 10 in accordance with a preferred embodiment of the present invention. A user first operates the phone's alphanumeric keypad 16 and/or scrolling dial 18 to enter a phone number and a corresponding name that the user wishes to add to the phonebook as depicted in steps 200 and 202. The processor 12 then either automatically assigns an entry number to the phone number and name or prompts the user to enter a number as depicted in step 204.

In accordance with one aspect of the present invention, the processor 12 also assigns a "call counter" to the entered phone number and initially sets the call counter to 0 as depicted in step 206. In accordance with another aspect of the present invention, the processor also assigns a "pseudo entry number" to the entered phone number and sets this number equal to the entry number as depicted in step 208. The processor may also prompt the user to indicate whether the order of the entry in the phonebook can be changed using the principles of the present invention as depicted in step 210. This allows the user to "lock-in" the order of certain entries such as the user's home or work phone number so that the order of these entries in the phonebook is never changed. The entered phone number and name and assigned entry number, call counter and pseudo entry number are then stored as a phonebook record in the memory 14.

Steps 200–210 in FIG. 2 are repeated for each phone number that the user wishes to save in the phonebook. As illustrated in FIG. 3, this results in the creation and storage of a plurality of phonebook records 22 in the phonebook, each containing an entry number, name, phone number, call counter, pseudo entry number, and an indication of whether the entry can be re-ordered. The user may add to the phonebook at any time by repeating the steps in FIG. 2.

FIG. 4 generally illustrates the steps to set certain parameters used in the dynamic ordering steps of the present invention. In step 400, the processor 12 prompts the user to select a parameter for use in ordering the entries. The parameter is preferably originating and/or destination phone calls. For example, the processor may count only outgoing calls, only incoming calls, or both. Once the user selects which calls to count, the processor prompts the user to select a "call ceiling" value in step 402. The call ceiling is used by the processor as a trigger to begin a dynamic reordering sequence as described below. The call ceiling may be any number greater than 0, but is preferably a number between 25 and 100.

Once the user has set up a phonebook as illustrated in FIG. 2 and set the initial dynamic ordering parameters as illustrated in FIG. 4, he or she may begin using the phone in a conventional manner.

Figure 5:
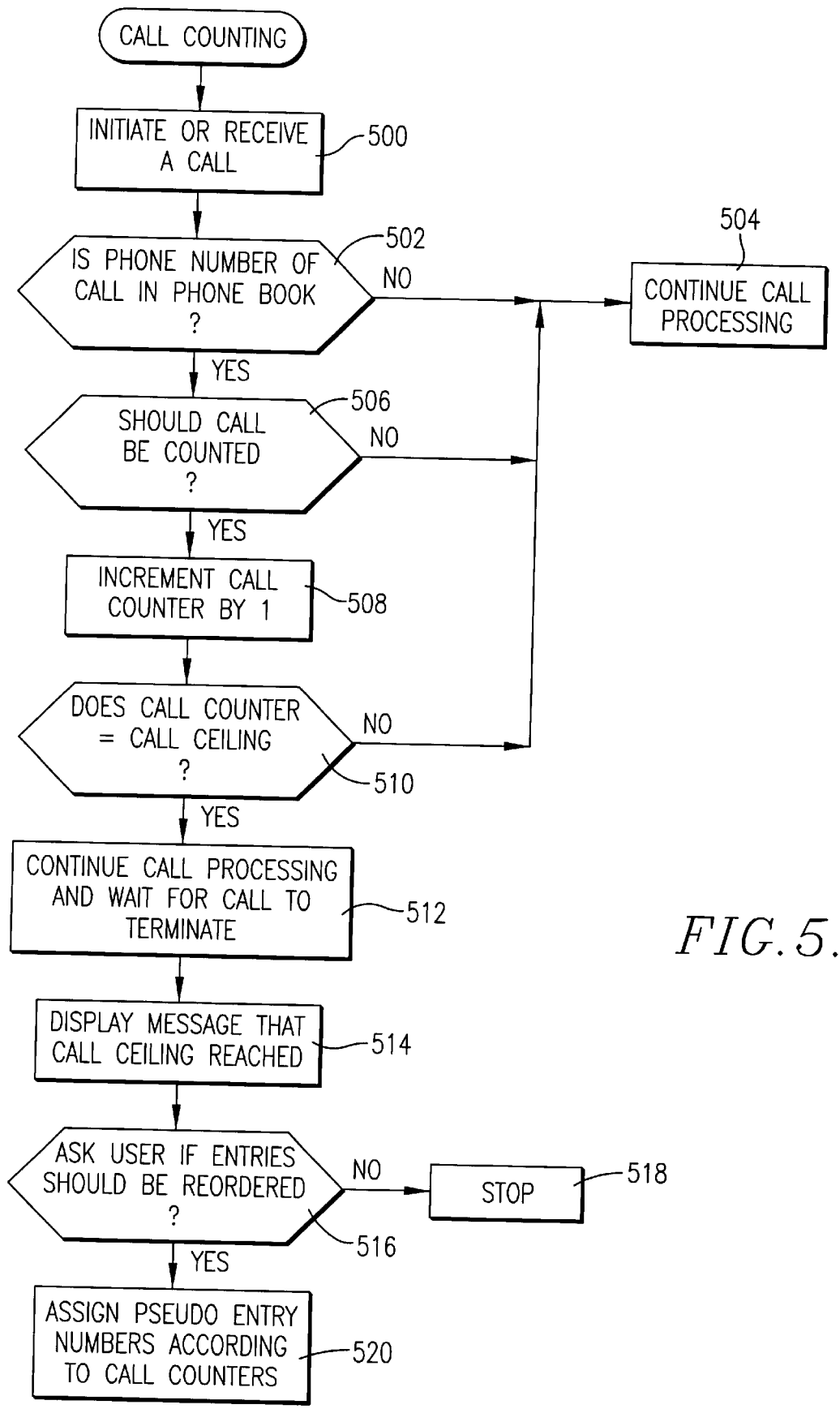
FIG. 5 is a flow diagram illustrating call counting steps in accordance with one aspect of the present invention.

FIG. 5 generally illustrates the steps performed by the processor 12 to begin a dynamic ordering process. The user first initiates or receives a call in a conventional manner as depicted in step 500. The processor then determines if the destination or originating phone number of the call is in the phonebook of FIG. 3 as depicted by step 502. If not, the processor directs the phone to process the call in a conventional manner and by-passes the further dynamic ordering steps depicted in FIG. 5.

If the answer to step 502 is yes, however, the processor 12 determines whether the call should be counted as depicted in step 506. For example, if the user selected to only count outgoing calls in step 400 of FIG. 4, and the current call is an incoming call, the answer to step 506 would be no. The processor would then direct the phone to continue conventional call processing as depicted in step 504.

If the answer to step 506 is yes, however, the processor 12 increments the call counter associated with the phone number in the phonebook by 1 as depicted in step 508. The processor continuously updates the call counter for each phonebook record in this manner and stores the information in the phonebook. For example, FIG. 6 shows that the phone number corresponding to entry number 1 has a call counter value of 12, which corresponds to 12 calls either made to and/or received from the phone number "913-111-1 111."

The processor 12 next determines whether the call counter for the phonebook record equals the call ceiling that was entered in step 402 of FIG. 4. If it does not, the processor directs the phone to continue conventional call processing as depicted in step 504. If it does, however, the processor directs the phone to continue call processing and then waits for the call to terminate as depicted in step 512. The processor then determines if the entry can be reordered as depicted in step 210 of FIG. 2, and if it can, directs the display to display a message indicating that the call ceiling has been reached as depicted in step 514.

The processor 12 next prompts the user to select whether he or she wishes to initiate a dynamic re-ordering of the entries in the phonebook as depicted in step 516. If the user selects no, the processor does nothing as depicted in step 518. However, if the user selects yes, the processor resets the pseudo entry numbers for the phonebook records according to the values of the call counters. For example, as illustrated in FIG. 6, the processor assigns a pseudo entry number of 1 to the phonebook record for entry number 2 because this phonebook record has the highest call counter, assigns a pseudo entry number of 2 to the phonebook record for entry number 1 because it has the next highest call counter, etc. This results in a re-ordering of the pseudo entry numbers for each phonebook record so that they are ordered based on the value of the call counters rather than the entry numbers.

The user may at any time select in which manner he or she wishes to display the records in the phonebook. Specifically, as illustrated in step 700 of FIG. 7, the processor 12 may prompt the user to select whether he or she wishes to display the entries according to the dynamic ordering of the pseudo entry numbers or according to the conventional ordering of the entry numbers. This prompt may occur after a phonebook has been initially set up or at other times as a matter of design choice. Step 702 then determines whether dynamic ordering was selected. If the answer is no, the processor continues to display the entries according to the entry number in a conventional manner as depicted in step 704. If the answer is yes, however, the processor displays the entries according to the ranking of the pseudo entry numbers as depicted in step 706. At any time, the user may repeat the steps illustrated in FIG. 7 to change the display method.

From time to time, the user may wish to reset the call counters for the phonebook records to account for changed circumstances or to simply conserve memory. For example, if the user moves to a new city or changes jobs, and therefore begins to make and receive calls to certain phone numbers more or less frequently, the user may wish to reset the call counters. The present invention includes three preferred methods for resetting the call counters.

Figure 8:
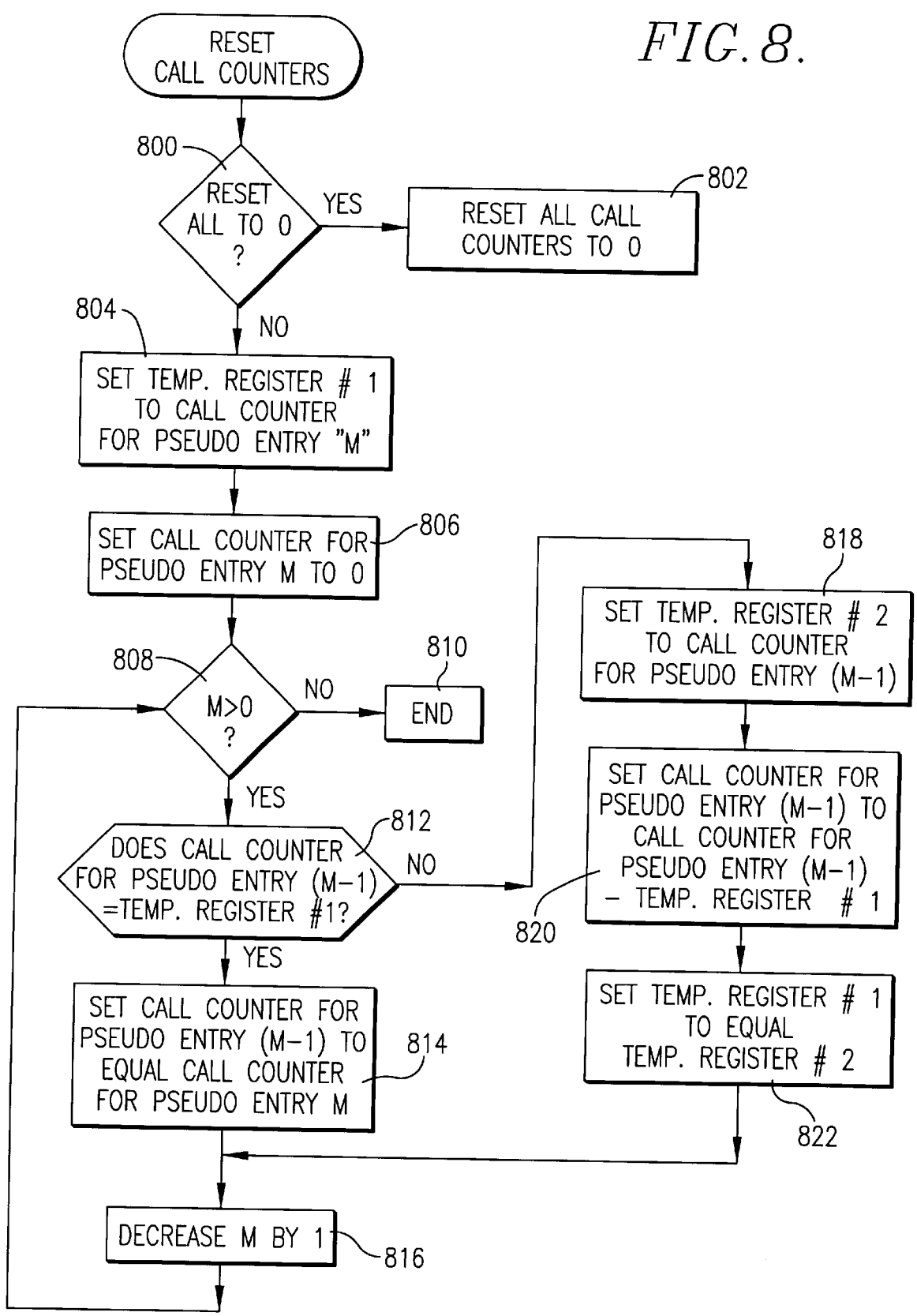
FIG. 8 is a flow diagram illustrating the steps to reset counters associated with the entries in the phonebook in accordance with one embodiment of the invention.

FIG. 8 illustrates the first two preferred methods for resetting the call counters. In the first method, step 800 prompts the user to select whether the user wishes to reset all call counters to 0. The user may wish to do this if the user moves to a new city as described above and, therefore, wishes to completely re-start a dynamic ordering process. If the answer to step 800 is yes, the processor resets all counters to 0 as depicted in step 802.

If the answer to step 800 is no, the processor moves to step 804 to reset the call counter according to the second preferred method. In this second resetting method, the call counters are reset in a manner so as to preserve the relative difference between the call counters of the phone records. This option is typically selected when the user wishes to reset the call counters to preserve memory space but also wishes to maintain the relative difference of the call counters so that the previously established dynamic ordering of the phone numbers is not disturbed. In this reset option, the processor first sets a "temp. register #1" equal to the current call counter value for the entry in the phonebook that has the lowest call counter value. For example, as depicted in FIG. 6, the phonebook record with the lowest call counter has a pseudo entry number "M" which is the number of entries in the phonebook.

The processor 12 next sets the call counter for pseudo entry M to equal 0 as depicted in step 806 and then asks if M is greater than 0 in step 808. If the answer to step 808 is no, the reset procedure is finished as depicted by step 810 because all phonebook records will have been reset.

However, if M is greater than 0, the processor moves to step 812 where it asks whether the call counter for the pseudo entry (M−1), which has the next lowest call counter value, equals the number stored in temp. register #1. This step basically determines whether the call counter values for the two phonebook records being compared are the same. If the answer is yes, the processor moves to step 814 where it sets the call counter for pseudo entry (M−1) to equal the call counter value for pseudo entry M so that both call records have the same call counter value, which has been pre-set to 0. The processor then decreases M by 1 in step 816 and loops back to step 808 to repeat the steps until M is no longer greater than 0.

If the answer to step 812 is no, however, the processor 12 moves to step 818 where it sets a "temp. register #2" equal to the call counter for pseudo entry (M−1). This temporarily preserves the call counter value for pseudo entry (M−1). The processor then moves to step 820 where it sets the new call counter for pseudo entry (M−1) to equal the difference between the old call counter for pseudo entry (M−1) and the value in temp. register #1. The processor then moves to step 822 where it sets temp. register #1 to equal temp. register #2. The processor then returns to step 816.

Steps 804–822 result in the resetting of the call counters for all the phonebook records so that the call counter for the least frequently called number equals 0 and the call counters for the other records in the phonebook are set so as to maintain the relative difference between the previously stored call counter values. In FIG. 6, this would result in a call counter value of 0 for entry number M, a call counter value of 6 for entry number 1, and a call counter value of 16 for entry number 2.

Figure 9:
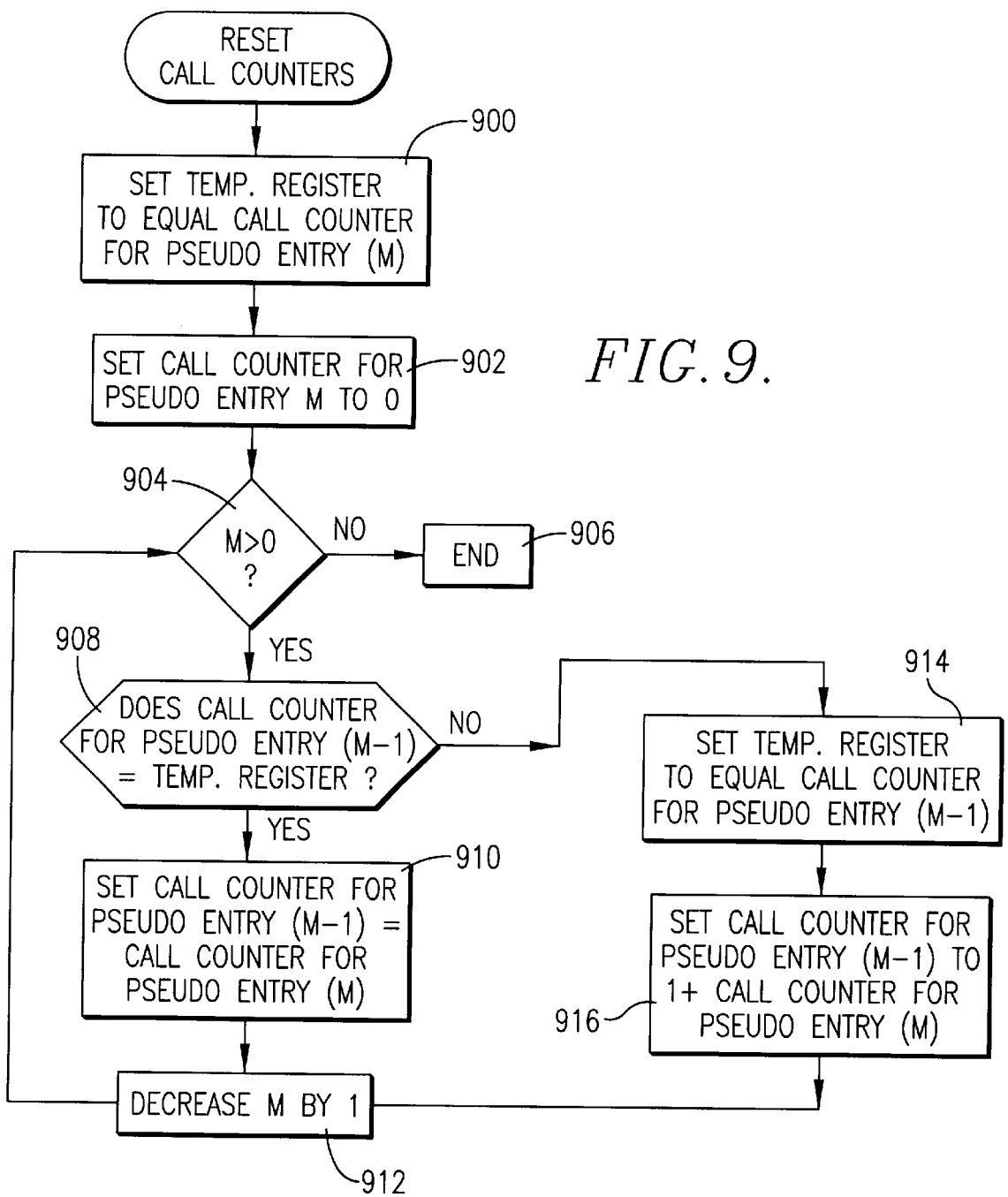
FIG. 9 is a flow diagram illustrating the steps to reset the counters in another embodiment of the invention.

FIG. 9 illustrates the third method of resetting the call counters. In this embodiment, the call counters are reset so that the phonebook record with the lowest call counter value and all other records having the same lowest call counter value are reset to 0, the next lowest call counter values are reset to 1, the next lowest call counter values are set to 2, etc. This reset procedure begins at step 900 where the processor sets a "temp. register" to equal the call counter for pseudo entry M, which has the lowest call counter value as described above. The processor then sets the call counter value for pseudo entry M to equal 0 in step 902 and asks if M is greater than 0 in step 904. If it is not, the reset procedure ends as depicted in step 906. However, if it is, the processor continues to step 908 where it asks if the call counter for pseudo entry (M−1) equals the value in the temp. register. If the answer is yes, the processor sets the call counter for pseudo entry (M−1) equal to the call counter for pseudo entry (M) in step 910. The processor then decreases M by 1 in step 912 and loops back to step 904.

If the answer to step 908 is no, however, the processor moves to step 914 where it sets the temp. register to equal the call counter for pseudo entry (M−1). The processor then sets the call counter for pseudo entry (M−1) to equal 1 plus the call counter for pseudo entry (M). The processor then moves to step 912 to continue resetting the call counters until M is no longer greater than 0.

Once the call counters for the phonebook records have been reset in accordance with any one of the three above-described methods, the user may once again begin making and receiving phone calls in a conventional manner. The processor then repeats the steps in FIG. 5 to continue dynamically re-ordering the phonebook records based on the number of calls received from and/or made to the phone numbers in the phonebook.

Although the invention has been described with reference to the preferred embodiment illustrated in the attached drawing figures, it is noted that equivalents may be employed and substitutions made herein without departing from the scope of the invention as recited in the claims. For example, although several preferred embodiments for programming the processor to perform the dynamic ordering steps of the present invention have been illustrated and described herein, the processor may be programmed in other manners to perform the same general functions without departing from the scope of the invention.

Having thus described the preferred embodiment of the invention, what is claimed as new and desired to be protected by Letters Patent includes the following:

1. A method of ordering a phonebook stored in a communication device, wherein the phonebook contains a plurality of entries each corresponding to a telephone number, the method comprising the steps of:

selecting at least two of the entries for dynamic ordering;

counting a parameter relating to at least each of the entries selected for dynamic ordering;

counting a number of calls and comparing the number of calls to a call ceiling;

asking a user if the userwould like the phonebook to be reordered, when the number of calls equals the call ceiling; and re-ordering the phonebook based on the counting of the parameter for each of the entries selected for dynamic ordering so that entries selected for dynamic ordering associated with a higher parameter count appear in the phonebook before entries selected for dynamic ordering associated with a lower parameter count without changing the order of entries not selected for dynamic ordering.

2. The method as set forth in claim 1, the parameter being the number of calls made by the communication device to each of the telephone numbers.

3. The method as set forth in claim 1, the parameter being the number of calls received by the communication device from each of the telephone numbers.

4. The method as set forth in claim 1, the parameter including both the number of calls made by the communication device to the telephone numbers and the number of calls received by the communication device from the telephone numbers.

5. The method as set forth in claim 1, the communication device being a mobile phone.

6. The method as set forth in claim 1, further including the step of storing counts corresponding to the counting of the parameters in memory in the communication device.

7. A method of ordering a phonebook stored in a communication device, wherein the phonebook contains a plurality of entries each corresponding to a telephone number, the method comprising the steps of:

selecting at least one of the entries for locked ordering;

counting the number of calls made by the communication device to each of the telephone numbers corresponding to at least the entries not selected for locked ordering;

asking a user if the userwould like the phonebook to be reordered, when the number of calls equals a call ceiling; and re-ordering the phonebook based on the counting so that entries not selected for locked ordering associated with more frequently called telephone numbers appear in the phonebook before entries not selected for locked ordering associated with less frequently called telephone numbers without changing the order of entries selected for locked ordering.

8. The method as set forth in claim 7, further including the steps of:
   counting the number of calls received by the communication device from each of the telephone numbers corresponding to the entries in the phonebook;
   adding the number of calls received by the communication device from each of the telephone numbers to the number of calls made by the communication device to each of the telephone numbers to obtain a sum count for each of the telephone numbers corresponding to the entries; and
   re-ordering the phonebook based on the sum count for each of the telephone numbers so that entries associated with a higher sum count appear in the phonebook before entries associated with a lower sum count.

9. The method as set forth in claim 7, the communication device being a mobile phone.

10. A computer program stored on a readable memory device for ordering a phonebook stored in a communication device, wherein the phonebook contains a plurality of entries each corresponding to a telephone number, the computer program comprising:
    a selection routine for selecting entries for locked ordering;
    a counting routine for counting a parameter relating to at least each of the entries not selected for locked ordering;
    a call ceiling verification routine for asking a user if the user would like the phonebook to be reordered, when a number of calls equals a call ceiling; and
    a re-ordering routine for re-ordering the phonebook based on the counting of the parameter so that entries not selected for locked ordering associated with a higher parameter count appear in the phonebook before entries not selected for locked ordering associated with a lower parameter count without changing the order of entries selected for locked ordering.

11. The computer program as set forth in claim 10, the parameter being the number of calls made by the communication device to each of the telephone numbers.

12. The computer program as set forth in claim 10, the parameter being the number of calls received by the communication device from each of the telephone numbers.

13. The computer program as set forth in claim 10, the parameter including both the number of calls made by the communication device to the telephone numbers and the number of calls received by the communication device from the telephone numbers.

14. The computer program as set forth in claim 10, the communication device being a mobile phone.

15. The computer program as set forth in claim 10, further including a routine for storing counts corresponding to the counting of the parameters in a memory device.

16. In a communications device including a means for permitting a user to make telephone calls to a plurality of telephone numbers and to receive telephone calls from a plurality of telephone numbers, the improvement comprising:
    means for permitting the user to create a phonebook containing a plurality of entries each corresponding to a telephone number;
    means for selecting entries for locked ordering;
    means for counting a parameter relating to at least each of the entries not selected for locked ordering;
    means for asking a user if the user would like the phonebook to be reordered, when a number of calls equals a call ceiling; and
    means for re-ordering the phonebook based on the counting of the parameter so that entries not selected for locked ordering associated with a higher parameter count appear in the phonebook before entries not selected for locked ordering associated with a lower parameter count without changing the order of entries selected for locked ordering.

17. The communication device as set forth in claim 16, the parameter being the number of calls made by the communication device to each of the telephone numbers.

18. The communication device as set forth in claim 16, the parameter being the number of calls received by the communication device from each of the telephone numbers.

19. The communication device as set forth in claim 16, the parameter including both the number of calls made by the communication device to the telephone numbers and the number of calls received by the communication device from the telephone numbers.

20. The communication device as set forth in claim 16, the communication device being a mobile phone.

21. A method of ordering a phonebook stored in a communication device, wherein the phonebook contains a plurality of entries each corresponding to a telephone number, the method comprising the steps of:
    receiving the telephone number from a user;
    assigning an entry number to the telephone number;
    assigning a pseudo entry number to the telephone number;
    setting the pseudo entry number equal to the entry number;
    entering the telephone number, the entry number, and the pseudo entry number into one of the entries;
    assigning a call counter to the entry;
    prompting the user to indicate whether the entry number may be changed according to the call counter;
    prompting the user to select a parameter for changing the entry number, the parameter being selected from the group consisting of—outgoing calls, incoming calls, and total calls;
    prompting the user to enter a call ceiling;
    incrementing the call counter each time the telephone number is used according to the parameter;
    updating the pseudo entry number each time the telephone number is used according to the parameter;
    incrementing a total counter each time an incoming call is received;
    incrementing the total counter each time an outgoing call is made;
    comparing the total counter to the call ceiling;
    prompting the user to indicate if the phonebook should be reordered, when the total counter equals the call ceiling; and
    re-ordering the phonebook by moving the pseudo entry number into the entry number for each entry that the user wishes to re-order and arranging the entries according to the entry number, only when the user indicates that the phonebook should be reordered.

* * * * *